Figure 1:
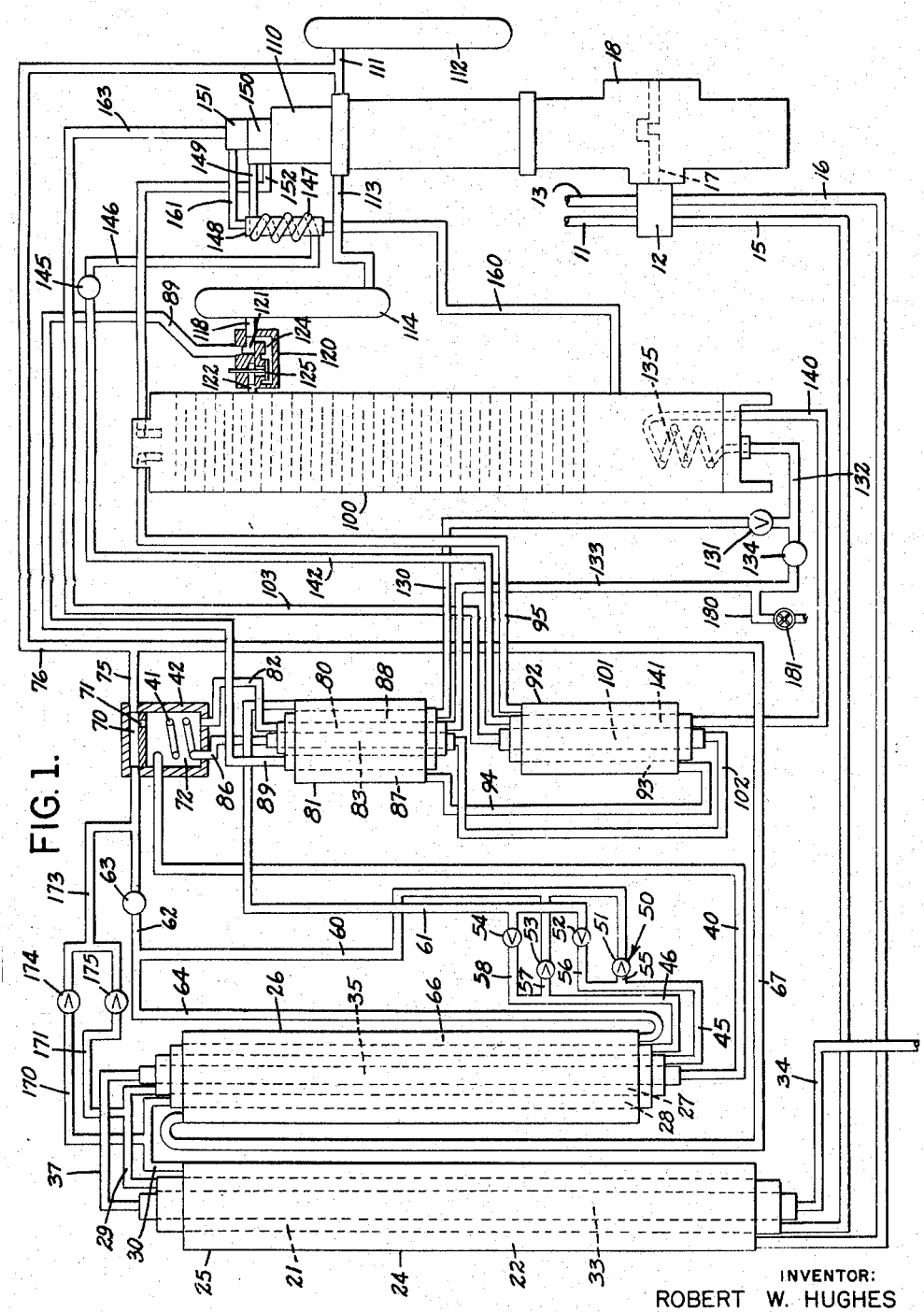

Sept. 22, 1959     R. W. HUGHES     2,904,966
APPARATUS FOR AND METHOD OF SEPARATING GASES
Filed July 28, 1955     2 Sheets-Sheet 1

INVENTOR:
ROBERT W. HUGHES
BY
ATTORNEY

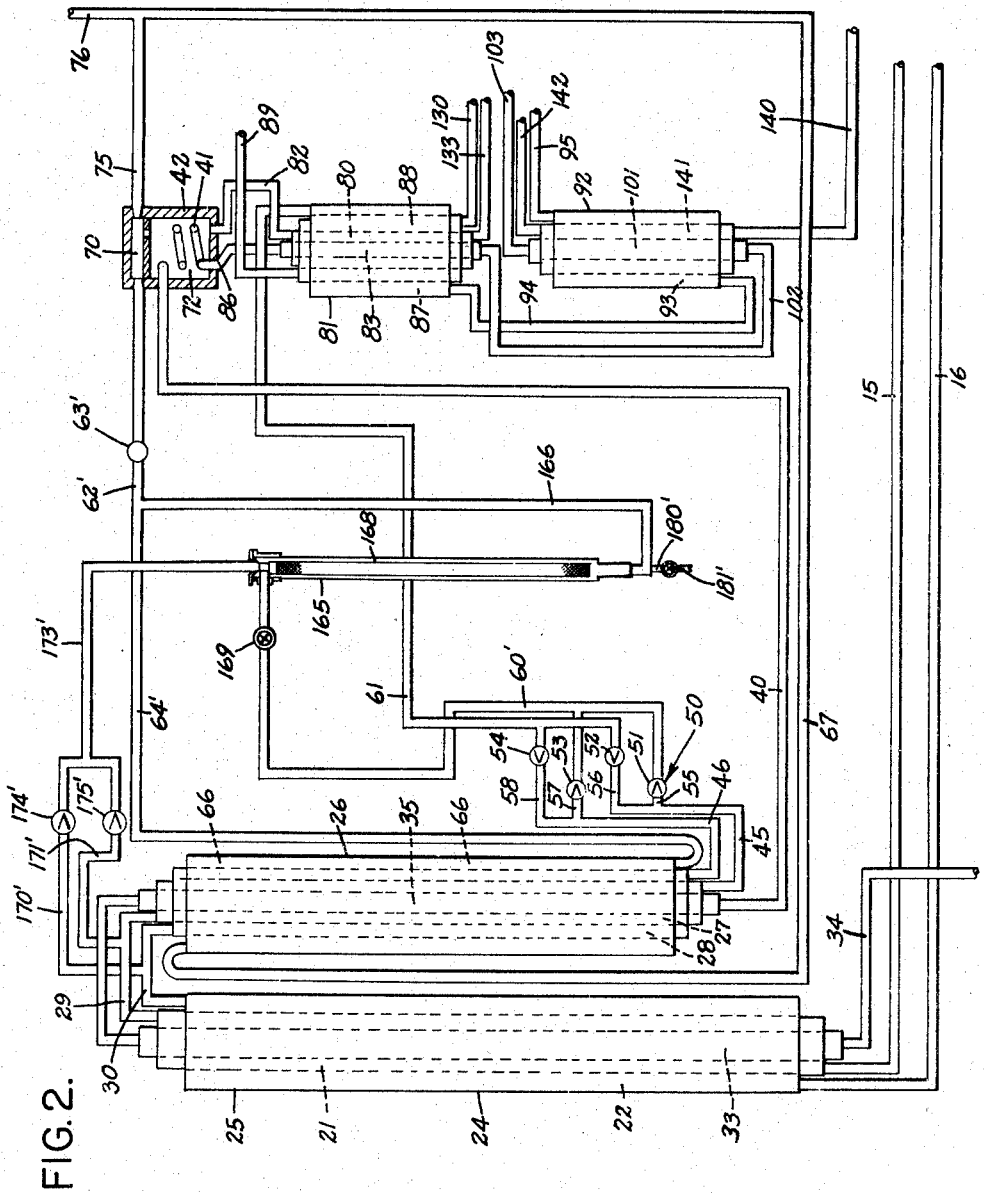

United States Patent Office 2,904,966
Patented Sept. 22, 1959

2,904,966

APPARATUS FOR AND METHOD OF SEPARATING GASES

Robert W. Hughes, Michigan City, Ind., assignor to Joy Manufacturing Company, Pittsburgh, Pa., a corporation of Pennsylvania Application July 28, 1955, Serial No. 524,940

8 Claims. (Cl. 62—13)

This invention relates to apparatus for and a method of separating gases and more particularly to an apparatus for and method of separating oxygen from the remaining constituents of air. The invention is concerned primarily with a so-called warm-up or defrosting method and means for an oxygen generating plant.

In the separation of oxygen from air wherein air is condensed to a liquid state and then in the latter state is distilled in a rectification column, as the temperatures at which rectification is effected are far below those at which the condensation of water and carbon dioxide takes place, there is always present in separating systems of the general type to which the present invention is applicable, the problem of removing these impurities at a point in the system wherein they can be periodically removed, and thereby minimize the chances of their being deposited at a later point in the system where they would cause a plugging of the apparatus. This problem, for the most part, has been solved by the use of reversing heat exchangers wherein the entering air or other mixture of gases to be separated is directed through a heat exchange zone in counterflowing heat exchange relation with a stream containing at least one product of rectification of the mixture, at a lower temperature, to thus lower the temperature of the incoming mixture below the condensation point of the higher boiling point impurities, water and carbon dioxide in the case of air, to thereby remove these impurities in the passages through which the entering mixture passes. The flow of the entering mixture and the aforementioned separation stream is periodically reversed in the courses of the heat exchanger with the result that the latter stream on its next ensuing passage through the course just previously occupied by the entering mixture causes the re-evaporation of the impurities and their removal from the system.

The present invention is concerned primarily with the removal of any higher boiling point impurities which, for example during long periods of operation of the generating unit, get through the reversing heat exchange zone, so to speak, and become deposited in other parts of the apparatus where their continued deposition would cause a pressure drop across the apparatus and render the system inoperative. In most generating systems the higher boiling point impurities, which are not removed from the mixture of gases to be separated in the reversing heat exchange zone, are deposited in a second heat exchanger or other piece of apparatus wherein the temperature of the partially purified mixture is reduced below the condensation point of the impurities. In the alternative, if desired, a filter can be placed ahead of the last mentioned apparatus in which the impurities can be collected and then the latter unit be periodically purged to remove the impurities to the atmosphere. It is a primary object of the present invention to provide a means for periodically warming, so to speak, parts of a generating apparatus whereby the above mentioned impurities which have been deposited can be purged from the system with the minimum loss of operating time and efficiency. It is another primary object of the invention to provide an improved method for warming or thawing certain parts of a generating apparatus wherein the aforementioned impurities can be removed from the system.

In one embodiment of the invention illustrated, the novel warm-up means and method is shown and described as applied to an oxygen generating system of the type disclosed in the Samuel C. Collins application Serial No. 383,437, filed October 1, 1953, now matured into Patent No. 2,732,693, granted January 31, 1956, which is assigned to the assignee of this invention. It will be understood however that the present invention is equally applicable to other plants designed and constructed for the separation of mixtures of gases and that its association with the system disclosed in the aforementioned Collins application is not in any way to be taken as limiting the scope of the present invention.

In the oxygen generating unit disclosed in Collins there is provided a reversing heat exchanger through which an entering air stream passes in countercurrent heat exchange relation with outgoing oxygen product and nitrogen effluent streams. The flow of the entering air and the leaving nitrogen effluent streams is periodically reversed in the reversing heat exchange courses with the result that the impurities which are deposited on the walls of one of the heat exchanger courses during the air flow therethrough are re-evaporated and removed from the system on the next ensuing passage of the nitrogen effluent stream therethrough. A portion of the purified air stream, subsequent to its passage through the reversing heat exchanger, is recirculated through at least a portion of the reversing heat exchange zone in heat exchange relation with the aforementioned constituents, to thus lower the temperature of the entering air stream and insure a low enough temperature to remove substantially all of the carbon dioxide and water vapor therefrom. The remaining portion of the air stream is further split with one portion passing first through a condensor where it is in heat exchange relation with the outgoing oxygen product and then through a non-reversing heat exchange zone in heat exchange relation with the outgoing oxygen product and nitrogen effluent. The third split off portion of the purified air stream is united with the first portion subsequent to the latter's being recirculated through the reversing heat exchange zone, with the united stream being passed through an expansion device, wherein cooling takes place according to the Joule-Thomson effect, and then through the aforementioned non-reversing heat exchange zone in heat exchange relation with the oxygen product, nitrogen effluent, and second split off portion of the purified air stream. The combined first and third portions of the air stream are subsequently united with the second split off portion of the air stream and the resulting stream is passed into a rectification column wherein the separation of oxygen from the remaining constituents of air takes place.

Inasmuch as the temperature of the aforementioned second stream of air is far below the condensation point of water or carbon dioxide, any of these impurities carried through the reversing heat exchange unit will be deposited, in the embodiment of the invention now being considered, in the relatively small courses of the non-reversing heat exchanger. In this form the present invention is directed to a method and means of removing any of these higher boiling point impurities which may be deposited in the non-reversing heat exchanger. For this purpose there is provided a means for selectively diverting a portion of the relatively warm entering air stream from a point intermediate the ends of the reversing heat exchanger unit and for directing it through the aforementioned second heat exchanger course which is traversed by a portion of the partially purified air stream, to warm the latter heat exchanger course and re-evaporate any of the aforementioned impurities deposited therein. A means is also provided for directing the re-evaporated impurities-contaminated air stream from the system at a point upstream, with respect to air flow, from the separating apparatus.

In another embodiment of the invention wherein a suitable separating unit such as a filter is placed upstream, with respect to air flow, from the second heat exchanger and through which all of the air from the reversing heat exchanger unit passes to thus remove any of the higher boiling point impurities which might carry over from the reversing heat exchanger, there is provided a means for diverting a portion of the relatively warm entering air stream from a point intermediate the ends of the reversing heat exchanger and for directing it through the above mentioned filter, to warm the latter and re-evaporate any of the aforementioned impurities deposited therein. Means are also provided for directing the re-evaporated impurities-contaminated air stream from the filter to the atmosphere.

Other objects and advantages of the present invention in addition to those abovementioned will be apparent from the following more detailed description of the invention when read in conjunction with the attached drawings in which:

Fig. 1 is a schematic diagram of an oxygen generating system embodying one form of the present invention; and Fig. 2 is also a schematic diagram showing a modification of the system of Fig. 1.

Referring now more specifically to the drawings and first to Fig. 1, air at a temperature of approximately 300° K. and a pressure of 160–175 p.s.i.g. is delivered from a suitable air compressor (not shown), through a conduit 11 to a valve mechanism indicated generally at 12. The nitrogen effluent is removed from the system to the atmosphere through a conduit 13 which is also connected with valve 12. Valve 12 is preferably of the mechanically actuated type and is periodically moved to reverse the connections of the conduits 11 and 13 with a pair of conduits 15 and 16 which connect with the valve casing 12. In the Samuel C. Collins application Serial No. 661,253, filed April 11, 1946, now matured into Patent No. 2,716,333, granted August 30, 1955, there is shown a reversing valve mechanism suitable for the performance of the functions of the valve mechanism 12. The valve mechanism 12 may be actuated in any conventional manner and in the form herein illustrated takes power from the drive shaft 17 of an expansion engine 18.

Conduits 15 and 16 are connected at their other ends with courses 21 and 22, respectively, of one section 24 of a reversing heat exchange unit designated generally at 25. It will be understood by those skilled in the art that the reversing heat exchanger 25 could be made up of a single unit, however, in order to minimize the overall height of the apparatus of which the reversing heat exchanger forms a part, the heat exchanger in the illustrated embodiment comprises two sections, namely 24 and 26. The aforementioned courses 21 and 22 of heat exchanger section 24 are connected to corresponding courses 27 and 28 in the heat exchanger section 26 by means of conduits 29 and 30 respectively. Heat exchanger section 24 contains a further course 33 through which oxygen product passes, as will be described more in detail hereinafter, with a conduit 34 being connected at the lower end of course 33 to carry the oxygen from the system to a suitable storage means (not shown). Course 33 is connected to a corresponding course 35 in heat exchanger section 26 by means of a conduit 37 which connects the courses at their upper ends.

A conduit 40, through which oxygen product flows to the reversing heat exchanger, connects the lower end of course 35 of heat exchanger section 26 to a course 41 in a condenser unit 42. The lower ends of courses 27 and 28, through which alternately pass the entering air stream and outgoing nitrogen effluent stream, have connected thereto conduits 45 and 46 respectively. A suitable automatic reversing valve mechanism indicated generally at 50 and comprising a series of four automatic check valves 51, 52, 53, and 54 is provided beyond, in the terms of air flow, the heat exchanger 25, with valves 51 and 52 communicating with conduit 45 through branch conduits 55 and 56, and valves 53 and 54 communicating with conduit 46 through conduits 57 and 58. For a detailed description of this type of automatic reversing valve mechanism, reference is again made to the aforementioned Samuel C. Collins Patent No. 2,716,333, granted August 30, 1955. It might be pointed out at this point, however, that the valves 51, 52, 53 and 54 open in the direction of the >'s, as indicated on the drawings, and resist flow therethrough in the other direction. Conduits 55 and 57 on their downstream sides, with respect to air flow, communicate with a conduit 60, while conduits 56 and 58 communicate at their upstream ends, with respect to nitrogen effluent flow, with a conduit 61. Conduit 60 connects at its other end with a conduit 62 in which there is placed a restricter device 63. A further conduit 64 connects with conduits 60 and 62 at the juncture of the latter two conduits, conduit 64 being connected at its other end with a further course 66 in heat exchange section 26. A portion of the air stream is thus diverted through conduit 64 due to the small resistance to passage through restricter device 63 and recirculated through course 66 where it is in heat exchange relation with the other aforementioned constituents which pass through the reversing heat exchange zone, to add refrigeration, so to speak, to the reversing heat exchanger section 26 and thus insure that the temperature of the main air stream is below the condensation temperatures of carbon dioxide and water.

Beyond the restricter device 63 conduit 62 communicates with a chamber 70 within the top of the evaporator-condenser unit 42. Chamber 70 is connected through a small opening 71 with a course 72 of the evaporator-condenser 42, the latter course being in heat exchange relation with the aforementioned oxygen course 41. Chamber 70 also communicates through a conduit 75 with a conduit 76, the latter constituting an extension of a conduit 67 through which the recirculated air stream flows from the reversing heat exchanger course 66. For a detailed description of the conditions under which the system thus far described ideally operates, reference is again made to the Samuel C. Collins Patent No. 2,732,- 693, granted January 31, 1956. It will suffice for the purposes of this description to say that the air which flows through either valve 51 or 53 into the conduit 60, due to the slight resistance to flow offered by the restricter device 63 is split, with a smaller portion thereof flowing through conduit 64, course 66 of the heat exchanger unit 26, conduit 67 and into conduit 76. The major portion of the air, on the other hand, flows through the restricter device 63 and into the chamber 70 of the evaporator-condenser 42, with a portion thereof flowing through the opening 71 into course 72 of the condenser, while the remainder flows through conduit 75 and into conduit 76 where it is united with the first mentioned split off portion of the air stream.

Course 72 of the condenser 42 communicates with a course 80 in a further heat exchanger 81 through a conduit 82, while oxygen course 41 of the condenser communicates with a second course 83 in the heat exchanger 81 through a conduit 86. Conduit 61, through which the outgoing nitrogen effluent flows, connects with a further course 87 in heat exchanger 81, while the remaining course 88 of this heat exchanger connects at its upper end with a conduit 89 through which cold expanded air from the expansion engine 18 flows, as will be explained below.

A further heat exchanger unit 92 has one course 93 thereof in communication with the nitrogen course 87 of heat exchanger 81 through a conduit 94. Course 93 is connected at its other end to a conduit 95 which conducts nitrogen rich waste gases from the upper end of a rectification unit 100. A second course 101 in the heat exchanger unit 92 connects through a conduit 102 with the oxygen course 83 of heat exchanger 81. Course 101 is connected at its upper end to a conduit 103 through which oxygen product flows from the rectification unit as will also be explained below.

The expansion engine 18, which may be of the construction shown in Patent No. 2,607,322 granted August 19, 1952 to Samuel C. Collins, provided with suitable means for predeterminedly lengthening and shortening the period of admission, includes a cylinder 110 having admission and exhaust valves (not shown) and to the admission valve of which air under pressure is admitted from the conduit 76 through a conduit 111 with which an in-take surge tank 112 is connected so as to minimize fluctuations in flow. A discharge conduit 113 leads from the expansion engine 18 to a discharge surge tank 114 which may have associated with it a strainer to catch any snow or other impurities which are not removed in the reversing heat exchanger unit and that might otherwise pass to the rectification column.

The discharge surge chamber 114 is in communication with a valve structure 120 through a conduit 118. The valve structure includes a passage or chamber 121 continuously in communication with the aforementioned conduit 89 and another chamber 124 connected through a conduit 122 directly with the rectification column 100 at a point somewhat below the top of the latter. The valve structure 120 which may be called a bypass valve, is adapted to have the two chambers aforementioned connected in communication with each other and thus to connect discharge surge chamber 114 in free communication with the upper part of the column through the conduit 118, valve structure 120 and conduit 122. A valve 125 provides communication between the chamber 124 and the conduit 122. As is set forth in detail in the Collins Patent No. 2,732,693, granted January 31, 1956, the working structure of the expansion engine can be varied depending on whether the surge chamber 114 is in communication with the conduit 89 and with the rectification column or merely in communication with the conduit 89.

The cold expanded air from the expansion engine passes from the conduit 89 through the aforementioned course 88 in heat exchanger unit 81 and then through a conduit 130 having a check valve 131 positioned therein into a conduit 132 where it is united with the liquefied air stream passing from the condenser unit 42 through conduit 82, course 80 in the heat exchanger 81, a conduit 133 and an expansion valve 134. The united air stream containing some liquid air passes from conduit 132 into a condenser coil 135 in the lower portion of the rectification column 100. The liquefied air flows out from the condenser element 135 through a conduit 140 into a further course 141 in heat exchanger 92 and then through a conduit 142 which is in communication with the upper end of course 141. Conduit 142 is provided with a valve device 145 which is adjustable to effect a reduction in the pressure of the fluid (liquid air) which flows through it. The downstream side of the valve 145 is connected by means of a conduit 146 with a coil or jacket 147 which encompasses a strainer 148 through which oxygen flows. The other end of the coil 147 is in communication with a jacket 150 of a liquid oxygen pump 151 through a conduit 149. A further conduit 152 connects jacket 150 with the top of the rectification column 100. Oxygen is withdrawn from the rectification column 100 through a conduit 160 which connects with the lower end of the aforementioned strainer 148. A conduit 161 connects the upper end of strainer 148 with the liquid oxygen pump 151, the latter being connected by means of a conduit 163 with course 101 of heat exchanger unit 92.

Inasmuch as a detailed description of the operation of the oxygen plant, as thus far described, to produce high pressure or lower pressure oxygen can be found in Collins' Patent No. 2,732,693, granted January 31, 1956, it will suffice here to trace generally the flow of the various constituents through the system, before turning in detail to the improvements and additions to the unit as contemplated by the present invention. Assuming that the valve mechanisim 12 is set to connect conduit 11 with conduit 15, compressed air will flow through conduit 11, valve 12 and conduit 15, through courses 21 and 27 of the heat exchanger sections 24 and 26, through conduits 45 and 55, through valve 51 and into conduit 60. Because of the slight pressure drop across the restrictor device 63, a minor portion of the cold purified air from the reversing heat exchangers will flow back through conduit 64, course 66 in heat exchanger section 26, conduit 67 and into conduit 76. The major portion of the air will flow through the restricter device 63 and into the chamber 70, with a portion thereof, depending as to amount of flow, as is fully set forth in Collins' Patent No. 2,732,693, granted January 31, 1956, on whether the unit is set to produce low or high pressure oxygen, passing through opening 71 into condenser course 72, wherein it is liquefied and then passed through conduit 82, course 80 of the heat exchanger unit 81, conduit 133, through the expansion device 134 and into the conduit 132. The remaining portion of the air stream passes through conduit 75 and into conduit 76 where it is united with the portion of the air stream which was recirculated through the heat exchanger section 26, and then the united stream is passed through conduit 76 and into the expansion engine 18.

The cold expanded air from the expansion engine passes through conduit 113 into the discharge surge tank 114, out through conduit 118, and, assuming that low pressure oxygen is being produced, all of the expanded air flows from conduit 118 into conduit 89, then through course 88 in the heat exchanger 81, conduit 130 and into the conduit 132, where it is united with the aforementioned stream of liquid air. The combined air stream containing some liquid is then passed through coil 135 of the boiler condenser, and the resulting liquid air stream is directed through conduit 140, heat exchanger course 141 of heat exchanger 92, conduit 142, pressure reducer 145, conduit 146, jacket 147, conduit 149, jacket 150, conduit 152 and into the top of the rectification column 100. In the meantime, the nitrogen-rich waste gases leave the top of the rectification column through conduit 95, pass through course 93 of heat exchanger 92, conduit 94, course 87 of heat exchanger course 81, conduit 61, check valve 54, conduit 58, conduit 46, heat exchanger course 28, conduit 30, heat exchanger course 22, conduit 16, valve mechanism 12, conduit 13 and out to the atmosphere.

The oxygen product, on the other hand, flows from the rectification column through conduit 160, strainer 148, conduit 161, pump 151, conduit 163, course 101 of heat exchanger 92, conduit 102, course 83 of heat exchanger 81, conduit 86, course 41 of the evaporator-condenser 42, conduit 40, heat exchanger course 35, conduit 37, course 33, and through conduit 34 to a suitable storage chamber.

As aforementioned, the temperature of the air stream in the heat exchanger unit 25 is reduced to a point wherein substantially all of the water vapor and carbon dioxide are evaporated out and deposited on the walls of the reversing heat exchanger courses, with the impurities being re-evaporated and removed from the heat exchanger courses on the next ensuing passage of the nitrogen effluent therethrough. During normal operation and particularly during long periods of operation there may be times when all of the impurities are not removed in the heat exchanger with the result that a portion thereof pass on to other parts of the apparatus. As aforementioned, a strainer may be placed in the conduit leading from the expansion engine to remove any of the impurities which may have passed from the reversing heat exchanger through the conduit 76 and into the expansion engine.

The apparatus and method embodied in the present invention is designed to remove any impurities which may be deposited in the relatively small course 80 of heat exchanger 81 by periodically warming up or thawing this course, to thereby re-evaporate the impurities and remove them from the system.

As can be seen in the left side of Fig. 1, a conduit 170 is connected with the conduit 30 which connects the courses 22 and 28 in the heat exchanger sections 25 and 26. A second conduit 171 communicates with the conduit 29 which connects the upper end of the courses 21 and 27 of the reversing heat exchanger sections. Conduits 170 and 171 unite to form a single conduit 173, the latter conduit in turn communicating with conduit 62 downstream, with respect to air flow, from the restrictor device 63. Check valves 174 and 175 are provided in the conduits 170 and 171 respectively. A further conduit 180 is connected with the conduit 133 at a point upstream, with respect to air flow, from the expansion device 134. Conduit 180 is provided with a stop valve 181 and in the illustrated embodiment is exhausted directly to the atmosphere, although it will be understood that conduit 180 could be connected with the nitrogen waste gas flow conduit preferably at a point downstream from the reversing heat exchanger unit.

When it is desired to warm up or thaw the unit to remove impurities from the course 80 of the heat exchanger 81, valve 181 is opened wide. This causes a pressure drop and a flow of relatively dry warm air through the conduit 170 or 171, depending upon the setting of the reversing valve 12, through conduit 173, conduit 62, chamber 70, opening 71, condenser course 72, conduit 82, course 80 of heat exchanger 81, conduit 133, conduit 180 and through valve 181 to the atmosphere. The flow of relatively warm air causes the impurities which are deposited in the course 80 of the heat exchanger course 81 to sublime and be removed from the system. It will be understood, of course, that the reason the impurity contaminated air flows out through conduit 180 and valve 181 to the atmosphere is due to the resistance of expansion device 134, the stream seeking the path of least resistance, so to speak. After the heat exchanger 81 has been purged, valve 181 is closed and all of the air again flows through the reversing heat exchanger section 26.

Looking now at Fig. 2, it will be seen that the system therein illustrated in part is similar to the system illustrated in the embodiment of Fig. 1, however with an air filter or separator being positioned between the reversing heat exchanger unit and the second heat exchanger unit. Insofar as the system illustrated in Fig. 2 is the same as that of Fig. 1, like reference numerals will be used to identify correspondingly similar parts.

In the presently described embodiment of the invention, the conduit leading from the reversing valves 51 and 53, corresponding to the conduit 60 in the system of Fig. 1, and designated 60' in the embodiment of Fig. 2, connects these latter valves with the upper end of the air filter or separator 165. A suitable stop valve 169 is placed in the conduit 60' adjacent the point of connection of the latter with filter 165 for purposes hereinafter described. A conduit 166 connects the lower end of the filter 165 with a conduit 62' one end of which is connected with the chamber 70 in the upper part of evaporator-condenser unit 42. The other end of conduit 62' connects with the unbalance course 66 in the reversing heat exchanger section 26 through a conduit 64'. A suitable restricter device 63' is positioned in the conduit 62'.

It can be seen that the main air stream flowing from the reversing heat exchanger through either the valve 51 or the valve 53 flows through conduit 60' and into the upper end of the filter unit 165. Filter unit 165 can be of any known type, such as that disclosed in the patent to Samual C. Collins No. 2,685,174 issued August 3, 1954, and as illustrated comprises a cartridge 168 filled with a porous material which will collect any carbon dioxide, essentially in the form of snow, which may carry over from the reversing heat exchanger unit. The main air stream after it is freed of any remaining carbon dioxide impurities flows through the conduit 166 with the major portion thereof flowing through conduit 62' and the restricter device 63' into the chamber 70 above the evaporator-condenser unit 42. Due to the slight resistance of restricter device 63' a small portion of the purified air stream passes back through conduit 64', heat exchanger course 66, conduit 67 and into conduit 76 where it is united with the major portion of the air stream flowing out of conduit 75.

As in the system illustrated in Fig. 1 there is in the presently described system a pair of conduits, numbered 170' and 171' in the present instance, communicating with the conduits 30 and 29 respectively which connect the air and nitrogen effluent courses in the heat exchanger sections 24 and 26, the latter conduits uniting to form a single conduit 173' which connects with the upper end of the filter unit 165. Check valves 174' and 175' may be desirably placed in the conduits 170 and 171'. A further conduit 180' having a stop valve 181' positioned therein connects the lower end of the filter unit with the atmosphere. It can be seen that with the arrangement above described, the filter unit 165 can be defrosted or thawed out, so to speak, periodically, by closing valve 169 in the conduit 60' and opening the normally closed valve 181' in the conduit 180'. Relatively warm air will then flow through the conduits 170' and 171' and conduit 173' into the top of the filter unit 165. The passage of the relatively warm air through the filter unit will cause the carbon dioxide snow which has been deposited therein to be re-evaporated and purged from the system to the atmosphere through conduit 180'.

It will be readily understood by those skilled in the art that the apparatuses above mentioned and their associated methods provide a way of removing any impurities carried over from the reversing heat exchanger while the plant is still in operation with a very small heat loss through the reversing heat exchanger unit. It will also be understood that while as aforementioned there is in this application specifically described two forms which the invention may assume in practice, that these forms of the same are shown for purposes of illustration and that the invention may be modified and embodied in various other forms without departing from its spirit or the scope of the appended claims.

What I claim is:

1. In a method of rectifying a gaseous mixture to produce one component thereof as a nearly pure product, the steps of directing an entering mixture of gases through a heat exchange zone in heat exchange relation with at least one product of rectification of the mixture, at a lower temperature, to lower the temperature of said mixture and removed substantially all of at least one component of higher boiling point, directing for an initial period at least a portion of the purified gaseous mixture through a first path in a second heat exchange zone in counterflowing heat exchange relation with at least one product of rectification, at a lower temperature, to remove any remaining higher boiling point impurities, directing said purified mixture into a separating apparatus, diverting at least a portion of said gaseous mixture from a point intermediate the ends of said first heat exchange zone, increasing the temperature within said first path of the second heat exchange zone above the temperature existing therein during the said initial period by uniting said diverted portion of said entering gaseous mixture with at least a portion of said purified gaseous mixture prior to the latter's entering said second heat exchange zone, and venting said united mixture from the system subsequent to its passage through said second heat exchange zone and upstream from the point at which said purified mixture enters said separating apparatus.

2. In a method of rectifying a gaseous mixture to produce one component thereof as a nearly pure product, wherein an entering mixture of gases is passed through a heat exchange zone in heat exchange relation with at least one product of rectification of the mixture, at a lower temperature, to lower the temperature of said mixture and remove substantially all of at least one component of higher boiling point, and wherein a stream containing at least a portion of the purified gaseous mixture is passed for an initial period through a first path in a second heat exchange zone in counterflowing heat exchange relation with a fluid, at a lower temperature, to remove any remaining higher boiling point impurities, and the purified stream is directed into a separating apparatus; the improved method which comprises the steps of arresting the flow of said portion of said purified mixture into said separating apparatus, diverting at least a portion of said gaseous mixture from a point intermediate the ends of said first heat exchange zone, increasing the temperature within said first path of the second heat exchange zone above the temperature existing therein during the said initial period by uniting said diverted portion of said entering gaseous mixture with at least a portion of said purified gaseous mixture prior to the latter's entering said second heat exchange zone and conducting said united mixture from the system subsequent to its passage through said second heat exchange zone and upstream from the point at which said purified mixture normally enters said separating apparatus.

3. In a method of rectifying air to produce one component thereof as a nearly pure product, wherein an entering air stream is passed through a heat exchange zone in heat exchange relation with at least one product of rectification thereof, at a lower temperature, to lower the temperature of said air stream and remove substantially all of the water vapor and carbon dioxide impurities, directing for an initial period at least a portion of the purified air through a first zone in a second heat exchange zone in counterflowing heat exchange relation with a fluid, at a lower temperature, to remove any remaining water or carbon dioxide impurities, directing said purified air into a separating apparatus, diverting at least a portion of said air stream from a point intermediate the ends of said first heat exchange zone, increasing the temperature within said first path of the second heat exchange zone above the temperature existing therein during the said initial period by uniting said diverted portion of said entering air stream with at least a portion of said purified air stream prior to the latter's entering said second heat exchange zone, and conducting said united mixture from the system subsequent to its passage through said second heat exchange zone and upstream from the point at which said purified air stream normally enters said separating apparatus.

4. In a method of rectifying air to produce one component thereof as a nearly pure product, wherein an entering air stream is passed through a heat exchange zone in heat exchange relation with at least one product of rectification, at a lower temperature, to lower the temperature of said air stream and remove substantially all of the water vapor and carbon dioxide impurities therefrom, and wherein a stream containing at least a portion of the purified air is passed for an initial period through a first path in a second heat exchange zone in counterflowing heat exchange relation with a fluid, at a lower temperature, to remove any remaining water or carbon dioxide impurities, and the purified air stream is directed into a separating apparatus, the improved method which comprises the steps of arresting the flow of said stream of purified air into said separating apparatus, diverting at least a portion of the entering air stream from a point intermediate the ends of said heat exchange zone, increasing the temperature within said first path of the second heat exchange zone above the temperature existing therein during the said initial period by directing said diverted air stream through said path of said second heat exchange zone, and conducting the latter stream from the system upstream, with respect to air flow, from said separating apparatus.

5. In a method of rectifying a gaseous mixture to produce one component thereof as a nearly pure product, the steps of directing an entering stream of said gases through a heat exchange zone in counterflowing heat exchange with at least one product of rectification, at a lower temperature, to lower the temperature of said mixture and remove substantially all of at least one component of higher boiling point, splitting the purified stream of the mixture of gases, directing one of said split off streams through an expansion device, a second heat exchange zone, and into a separating apparatus, directing the second split off portion of the purified gaseous mixture through a path in said second heat exchange zone in heat exchange relation with said first split off portion and with at least one product of rectification, and then into said separating apparatus, diverting a portion of said entering mixture of gases from said first heat exchange zone at a point intermediate the ends thereof, uniting said diverted portion of the gaseous mixture with at least a portion of said purified stream of the gaseous mixture, directing at least a portion of said united stream through the aforementioned second split off portion path through said second heat exchange zone and directing the latter stream from said system at a point upstream, with respect to air flow, from the separating apparatus.

6. In a method of rectifying a gaseous mixture to produce one component thereof as a nearly pure product wherein an entering stream of said gases is passed through a heat exchange zone in counterflowing heat exchange with at least one product of rectification, at a lower temperature, to lower the temperature of said mixture and remove substantially all of at least one component of higher boiling point, the purified stream of the mixture of gases then being split, with one portion thereof being directed through an expansion device, a second heat exchange zone, and into a separating apparatus, and a second portion thereof being directed through a path in said second heat exchange zone in heat exchange relation with said first split off portion and with at least one product of rectification, and then into said separating apparatus; the improved method which comprises arresting the flow of said second split off portion prior to its entering said separating apparatus, diverting a portion of said entering mixture of gases from said first heat exchange zone at a point intermediate the ends thereof, uniting said diverted portion of the gaseous mixture with at least a portion of said purified stream of the gaseous mixture, and directing at least a portion of said united stream through the aforementioned second split off portion path through said second heat exchange zone and to the atmosphere.

7. In a method of rectifying air to produce one component thereof as a nearly pure product, wherein an entering air stream is passed through a heat exchange zone in counterflowing heat exchange with at least one product of rectification, at a lower temperature, to lower the temperature of said mixture and remove substantially all of the water vapor and carbon dioxide impurities therefrom, and wherein the purified air stream is split, with one portion thereof being passed through an expansion device, a second heat exchange zone, and into a separating apparatus, and a second portion thereof is passed through a path in said second heat exchange zone in heat exchange relation with said first split off portion and with at least one product of rectification, and then into said separating apparatus; the improved method of diverting a portion of said entering air stream from said first heat exchange zone at a point intermediate the ends thereof, uniting said diverted air stream portion with said at least a portion of the purified air stream, directing at least a portion of said united stream through the aforementioned second split off portion path through said second heat exchange zone and directing the latter stream from the system at a point upstream, with respect to the flow of said air streams, from said separating apparatus.

8. In a method of rectifying air to produce one component thereof as a nearly pure product, wherein an entering air stream is passed through a heat exchange zone in counterflowing heat exchange with at least one product of rectification, at a lower temperature, to lower the temperature of said mixture and remove substantially all of the water vapor and carbon dioxide impurities therefrom, and wherein the purified air stream is split, with one portion thereof being passed through an expansion device, a second heat exchange zone, and into a separating apparatus, and a second portion thereof is passed through a path in said second heat exchange zone in heat exchange relation with said first split off portion and with at least one product of rectification, and thence into said separating apparatus; the improved method of diverting at least a portion of said entering air stream from said first heat exchange zone at a point intermediate the ends thereof, and directing said diverted portion of said air stream through the aforementioned second split off portion path through said second heat exchange zone, thence from the system at a point upstream, with respect to the flow of said air streams, from said separating apparatus.

References Cited in the file of this patent
UNITED STATES PATENTS

| | | |
|---|---|---|
| 1,917,891 | Levin | July 11, 1933 |
| 2,411,680 | Dennis | Nov. 26, 1946 |
| 2,504,051 | Scheibel | Apr. 11, 1950 |
| 2,525,660 | Fausek | Oct. 10, 1950 |
| 2,572,933 | Houvener | Oct. 30, 1951 |
| 2,579,498 | Jenny | Dec. 25, 1951 |
| 2,663,168 | Schilling | Dec. 22, 1953 |
| 2,671,318 | Collins | Mar. 9, 1954 |
| 2,753,701 | Palmer | July 10, 1956 |